United States Patent [19]

Sepp et al.

[11] 4,457,001
[45] Jun. 26, 1984

[54] HOUSING SYSTEM FOR A LASER

[75] Inventors: Gunther Sepp, Ottobrunn; Peter Dyrna, Haar, both of Fed. Rep. of Germany

[73] Assignee: Messerschmitt-Bölkow-Blohm GmbH, Munich, Fed. Rep. of Germany

[21] Appl. No.: 354,891

[22] Filed: Mar. 4, 1982

[30] Foreign Application Priority Data

Mar. 13, 1981 [DE] Fed. Rep. of Germany ....... 3109568

[51] Int. Cl.$^3$ ............................................... H01S 3/02
[52] U.S. Cl. ...................................... 372/59; 372/109
[58] Field of Search .......................... 372/109, 59, 33; 313/567

[56] References Cited

U.S. PATENT DOCUMENTS 3,147,395 9/1964 Street et al. ......................... 313/567
4,318,056 3/1982 Sze ....................................... 372/61

*Primary Examiner*—James W. Davie
*Attorney, Agent, or Firm*—W. G. Fasse; D. H. Kane, Jr.

[57] ABSTRACT

A laser such as a wave-guide laser with its housing is encased in a second housing which is also filled with laser gas. The second housing is sealed in a gas tight manner and includes a cylindrical portion, which may be made of metal, and a cap made at least partially of glass or ceramic. The cap is provided with a neck around the laser beam passage. The neck has a rated or predetermined break strength to make sure that a portion of the cap will break off at the neck when the laser is operated. The cap is provided with a device for monitoring or checking the operation status of the laser. The checking device includes a bellows, the interior of which is connected to sense the pressure inside the second housing. Further indicators showing whether the laser is operating are also provided in the cap which breaks off automatically with the aid of the bellows when the latter expands in response to a perforation of the cap by the initial laser operation. This type of structure increases the shelf life of the laser very substantially as compared to conventional lasers of this type because the second housing prevents the helium diffusion which takes place in conventional lasers.

10 Claims, 1 Drawing Figure

U.S. Patent
Jun. 26, 1984
4,457,001
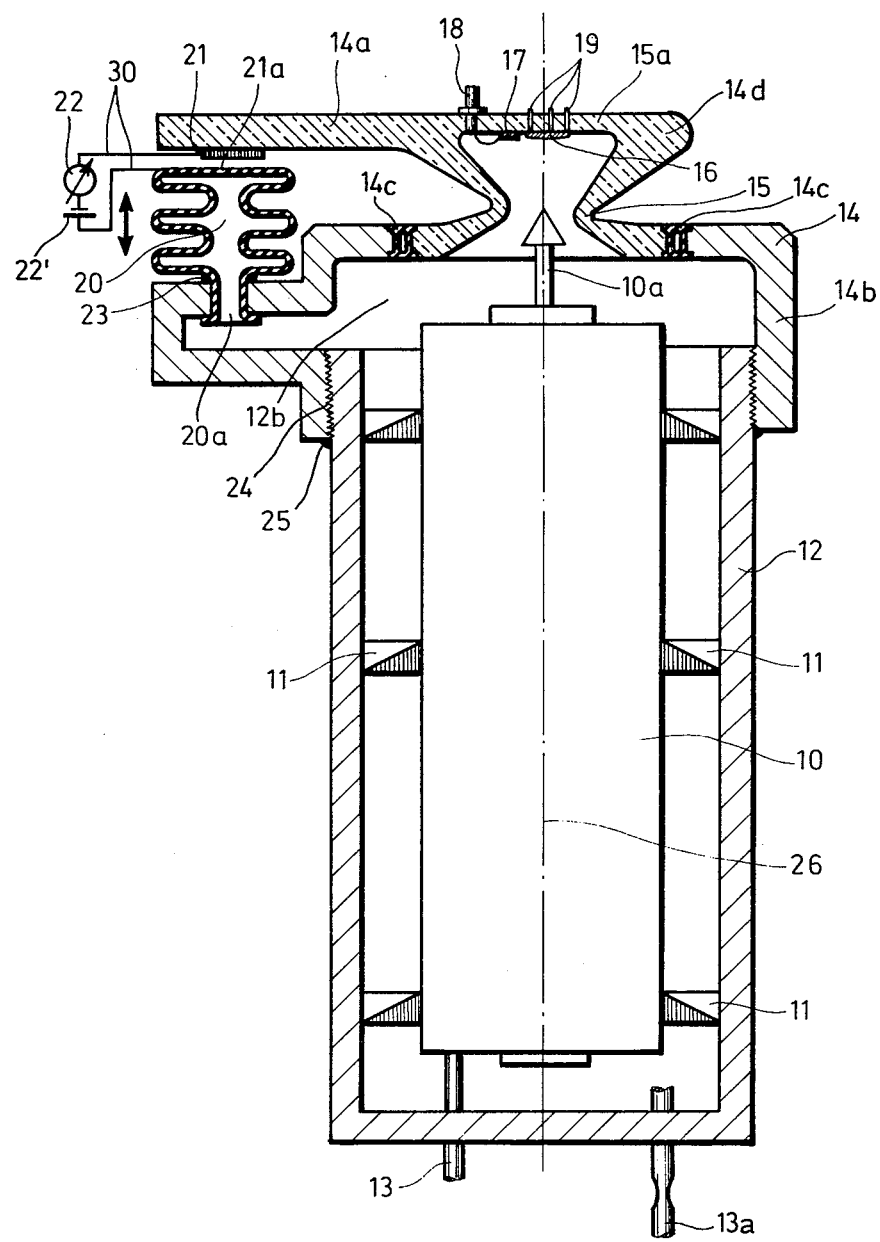

HOUSING SYSTEM FOR A LASER

CROSS-REFERENCE TO RELATED APPLICATION

The present application is based on the corresponding German Patent Application P 3,109,568.2, filed in the Federal Republic of Germany on Mar. 13, 1981. The priority of the German filing date is claimed for the present application.

BACKGROUND OF THE INVENTION

The present invention relates to a housing system for a laser such as wave-guide lasers, for example, of the type operated by a gas mixture including helium.

Such lasers are known in the art in many different modifications. However, all prior art wave-guide lasers of this type are subject to the same problems, namely, that their shelf life is rather limited, primarily due to the fact that the helium diffuses out of the laser housing. Heretofore attempts have been made to take this fact into account by providing the laser with a gas supply in excess of the normally necessary gas supply, such excess gas being referred to as a ballast gas volume. Attempts to solve the problem by properly sealing the laser have not been successful heretofore because the problems of sealing the laser itself are difficult to solve and any solution is accordingly rather expensive. Besides, even substantial efforts which are not always economically feasible do not necessarily guarantee an actual and permanent solution to the sealing problem. Besides, laser devices which are constructed for a single use, for example primarily laser weapons, do not justify this economical expense, particularly because the space and weight requirements for the additional gas volume are not practically feasible.

OBJECTS OF THE INVENTION

In view of the above it is the aim of the invention to achieve the following objects singly or in combination:
to construct a wave-guide laser so that it will have an extremely long shelf life without thereby substantially increasing its size or without thereby requiring a technical expense and effort which is economically unfeasible;
to solve the problem of the short shelf life of prior art wave-guide lasers in an optimal and reliable as well as in an economically feasible manner;
to provide means in a wave-guide laser which permits a continuous monitoring or a repeated checking of the interior pressure in the laser structure and of the laser function practically over any length of time;
to construct the laser for an automatic operation once the laser has been ignited; and
to keep the additional space requirements for each laser unit within practically feasible limits.

SUMMARY OF THE INVENTION

According to the invention there is provided a wave-guide laser with a laser beam projection or longitudinal axis of its laser housing. A second housing is so constructed that the main laser housing is operatively supported in the second housing which comprises a casing and a cap secured to the casing in a gas tight manner for keeping the second housing also filled with a laser gas such as a mixture of helium, nitrogen and carbon dioxide or neon under a reduced pressure. The cap has a neck section surrounding the laser beam projection axis. The neck section has a predetermined break strength smaller than the break strength of the rest of the cap so that the neck section may break off shortly after the laser is ignited. One or several bellows are mounted in the cap so that the interior of the bellows communicates with the interior of the second housing. The bellows are biased and arranged for cooperation with the neck section for breaking the neck section when the bellows expand in response to a pressure increase in the second housing as a result of the penetration of the cap by heating it sufficiently long with the initial laser beam. Indicator means are operatively located in the cap for indicating whether the laser has started to operate. The cap may further be provided with means for continuously or occasionally checking whether the pressure inside the second laser housing is still within a permissible operational range. The above mentioned bellows may be utilized for this purpose as will be described in more detail below.

BRIEF FIGURE DESCRIPTION

In order that the invention may be clearly understood, it will now be described, by way of example, with reference to the accompanying drawing in which the single FIGURE shows a sectional view through a wave-guide laser according to the invention.

DETAILED DESCRIPTION OF A PREFERRED EXAMPLE EMBODIMENT AND OF THE BEST MODE OF THE INVENTION

A conventional wave-guide laser 10 having a longitudinal laser beam projection axis 26 is entirely encased according to the invention in a second housing including a casing 12 and a cap 14. The laser 10 is mounted in the casing 12 by gas permeable support members 11. Voltage supply terminal means 13 reach in a sealed manner through the casing 12 into the laser 10 for igniting the laser in a conventional manner. Preferably, the casing 12 is a cylindrical tubular member closed at the lower end and open at the upper end for the installation of the laser 10. Once the laser 10 has been installed in the casing 12 and centered with the aid of the mounting members 11 the cap 14 is secured to the open end, for example by means of a threading 24 on the outside of the upper end of the casing 12 and on the inside of the cap 14 as shown. The top section 14d of the cap 14 is preferably made of glass or ceramic material bonded to a metallic socket section 14b by a glass-to-metal seal 14c. To assure a gas tight seal between the casing 12 and the cap 14 a seal 25 may be located as shown. Such seal may be provided in the form of a soldered or brazed seam 25 which fuses to the metal part 14b of the cap 14 and to the metal of the casing 12.

After the cap has been sealed to the casing, the volume 12b inside the cap and casing around the laser 10 is filled with a laser gas having substantially or approximately the same composition and approximately the same pressure as the gas in the wave-guide laser 10. Such gas may, for example, be a mixture of carbon dioxide, nitrogen or neon and helium under a pressure of about 100 millibar. The filling is done using a filling seal 13a which is then permanently sealed. It has been found that the sealing problems are much reduced by the present teaching of encasing the laser proper in a second housing and cap so that the shelf life of the laser 10 is surprisingly increased. For example, conventional lasers of this type usually have a shelf life of one to three years. Contrary thereto, the shelf life of a laser according to the invention is within the range of 5-15 years.

According to the invention the cap 14 comprises a contact lever arm 14a which is connected to the lower portion of the cap through a neck section 15 having a rated break strength smaller than the break strength anywhere else in the cap structure. The neck section 15 surrounds the laser beam projection axis 26 as shown. The rated break strength is accomplished by a reduced wall thickness in the neck section 15. The contact lever arm 14a is provided with a further wall portion 15a of reduced strength in the zone where the laser beam 10a is supposed to initially penetrate the wall surface 15a of the cap 14. The wall portion 15a carries on its inwardly facing surface a laser beam indicator platelet 16 of a material which is easily penetrated by the laser beam for forming cracks or channels 19 shortly after ignition of the laser as will be described in more detail below. The wall portion 15a is further equipped on its inwardly facing surface by a thermal element or sensor of the NTC type having a negative temperature coefficient. The thermal element 17 is operatively connected to an indicator 18 for showing whether the laser has ignited.

According to the invention one or several biased bellows 20 are arranged in the cap for cooperation with the lever arm 14a. The bellow or bellows 20 are made of metal or alloyed steel, whereby the bellows itself may constitute a contact 21a or it may carry a contact at the upper surface thereof. The contact lever arm 14a carries a similar contact 21 opposite the contact surface 21a of the bellows 20. An indicator 22 and a power supply such as a battery 22' are operatively connected to the contacts 21 and 21a through conductors 30 for monitoring or checking the pressure inside the second housing formed by the casing 12 and the cap 14 as will be described below. The indicator or meter 22 provides an indication of the operational status of the laser.

The lower or open end 20a of the bellows 20 is sealed into the cap 14 so that the interior of the bellows 20 and the space enclosed by the casing 12 and the cap 14 communicate with each other. Accordingly, the gas pressure inside the housing and inside the bellows is the same. A seal 23 may be provided around the neck portion of the bellows 20. The atmospheric pressure outside the bellows 20 is larger than the pressure inside the second housing, whereby the bellows 20 is biased in such a manner that normally the mechanical touching between the contacts 21 and 21a is prevented. Accordingly, no electrical current flows through the indicator instrument 22, whereby the pressure inside the housing may be continuously monitored. If a leak should occur the pressure inside the bellows would expand the bellows 20, whereby the contacts 21 and 21a cause a current flow through the indicator instrument 22 thereby indicating that the laser is not operational anymore due to a pressure increase inside the housing surrounding the laser 10.

The laser according to the invention operates as follows. Initially, the laser 10 is switched on or ignited by applying a suitable voltage to the terminal means 13. This part is conventional. The resulting laser beam 10a impinges on the laser beam indicating platelet 16, whereby the latter lights up to provide an indication of the proper function of the laser. Simultaneously, the thermosensing means 17, 18 also respond to the increased temperature to provide a second functional test to provide a redundant assurance that the encased laser 10 works properly. Thus, the laser may be tested for a fraction of a second without impairing its future operability.

However, if the duration of emission of the laser beam exceeds a predetermined minimum, for example one second, the reduced thickness surface 15a of the cap 14 is perforated due to laser beam absorption, thereby producing perforation holes or cracks 19 by means of which instantaneously atmospheric air enters into the space 12b formed by the casing 12 and the cap 14, whereby the interior pressure is raised from about 100 millibar to about 1000 millibar. As a result, the bellows 20 or several of such bellows expand to cause the electrical contact 21, 21a to close the current flow circuit for the indicator instrument 22, thereby showing that the perforation of the facing wall portion 15a has been successfully accomplished. As the pressure inside the housing space keeps increasing the interior pressure in the bellows 20 will also increase, thereby further expanding the bellows for breaking off the contact lever arm 14a at the neck section 15. As soon as this break occurs the lever arm portion 14a falls off and the laser is fully operational or ready for action. The just described construction of a wave-guide laser according to the invention provides an extremely long shelf life as compared to prior art lasers of this type. Additionally, the invention assures an automatic operation or function sequence, whereby the initial timing may be determined by the respective construction of the position and thickness of the neck section with the predetermined break strength and of the thickness of the surface area 15a for its perforation. In other words, said timing may be precisely predetermined by the respective material strength at the locations 15 and 15a.

As mentioned, one bellows 20 may be used. However, according to the invention a plurality of such bellows may also be used. In order to make the present laser structure safe against shocks or impact sensitivity, it is possible to make the neck section 15 and the wall portion 15a stronger. In that case it would be practical to use a plurality of bellows 20 for assuring the proper breaking of the neck section 15.

It is considered to be an advantage of the invention that no special external severing devices for the neck section are required and that the external housing is more easily sealed, for example, at 23 and 25 than the laser housing of the laser 10. Thus, the expense for the sealing is substantially reduced according to the invention. The laser function and the laser pressure may be tested as described above by the respective features provided by the invention. Moreover, the second housing requires only a small increase of shelf space as compared to prior art lasers.

Although the invention has been described with reference to specific example embodiments, it will be appreciated, that it is intended, to cover all modifications and equivalents within the scope of the appended claims.

What is claimed is:

1. A housing system for a laser having a laser beam projection axis (26), comprising a first laser housing (10), a second housing, means for operatively supporting said first laser housing in said second housing, said second housing comprising a casing and a cap secured to the casing in a gas tight manner for keeping the second housing normally also filled with a laser gas under reduced pressure, said cap having a neck section surrounding said laser beam projection axis, said neck section having a predetermined break strength smaller than that of the rest of the cap for breaking along said neck section, and bellows means mounted in said cap so that the interior of the bellows communicates with the interior of said second housing, said bellows means being biased and arranged for cooperation with said neck section for breaking said neck section when said bellows means expand in response to a pressure increase in said second housing, and indicator means operatively located in said cap for providing operational status information.

2. The laser housing system of claim 1, wherein said cap of the second housing has a top section made at least partially of glass, said cap further comprising a socket section made of metal and sealed to said top section of said cap.

3. The laser housing system of claim 1, wherein said cap of the second housing has a top section made at least partially of ceramic, said cap further comprising a socket section made of metal and sealed to said top section of said cap.

4. The laser housing system of claim 1, wherein said casing of said second housing is a cylindrical tube or pipe.

5. The laser housing system of claim 1, wherein said supporting means are gas permeable mounting means for mounting said first laser housing in said second housing substantially centrally and coaxially with said laser beam projection axis.

6. The laser housing system of claim 1, wherein said casing comprises a first threading and wherein said cap comprises a second matching threading for securing said cap to said casing, and sealing means sealing said cap in a gas tight manner to said casing.

7. The laser housing system of claim 1, wherein said indicator means in said cap comprise a laser beam indicator platelet (16) located so that said laser beam projection axis passes through the platelet (16), and thermal sensor means (17, 18) also located in said cap for providing an indication of the laser operation.

8. The laser housing system of claim 1, wherein said cap comprises a socket section (14b) connected to said casing and a lever arm section connected to said socket section through said neck section, said contact lever section cooperating with said bellows means for breaking said neck section when said bellows means expand.

9. The laser housing system of claim 8, further comprising a first electrical contact carried by said lever arm section, and a second electrical contact carried by said bellows means for closing an electrical circuit when said first and second contacts touch each other for indicating an operational status.

10. The laser housing system of claim 9, further comprising electrical circuit means (30) connected to said first and second contacts, and indicator means (22) operatively connected to said electrical circuit means for testing or indicating the operability status of said laser.

* * * * *